United States Patent [19]

Nakauchi et al.

[11] 3,881,186

[45] Apr. 29, 1975

[54] INCREMENTAL TAPE DRIVE APPARATUS FOR TAPE RECORDERS

[75] Inventors: Shunsaku Nakauchi; Takeo Kato, both of Mitaka, Tokyo, Japan

[73] Assignee: Kokusai Gijutsu Kaihatsu Kabushiki Kaisha, Tokyo, Japan

[22] Filed: Sept. 5, 1973

[21] Appl. No.: 394,550

[30] Foreign Application Priority Data

Sept. 8, 1972 Japan .............................. 47-89618

[52] U.S. Cl. .................... 360/90; 226/13; 360/130

[51] Int. Cl. .................... G11b 15/20; G11b 15/56

[58] Field of Search .......... 360/90, 71, 130; 226/13, 226/14

[56] References Cited

UNITED STATES PATENTS

| | | | |
|---|---|---|---|
| 2,814,676 | 11/1957 | House | 360/90 |
| 3,434,724 | 3/1969 | Palmer | 360/90 |
| 3,521,801 | 7/1970 | Clupper | 226/113 |
| 3,554,421 | 1/1971 | Streeter | 226/113 |

*Primary Examiner*—Bernard Konick
*Assistant Examiner*—Jay P. Lucas
*Attorney, Agent, or Firm*—Charles W. Helzer

[57] ABSTRACT

In an incremental digital magnetic tape recorder wherein a magnetic tape is advanced intermittently for recording intermittent input signals, there is provided means for deflecting the mangetic tape away from the direction of its normal travel between a magnetic head and a tape take up reel.

10 Claims, 5 Drawing Figures

INCREMENTAL TAPE DRIVE APPARATUS FOR TAPE RECORDERS

BACKGROUND OF THE INVENTION

This invention relates to an incremental digital magnetic tape recorder of the type such that upon input data to be recorded being applied, a magnetic tape (hereinafter, merely termed a tape) is advanced by a predetermined length necessary to record the data, and in the absence of any input, the tape is maintained inoperative.

Heretofore, magnetic tape recorders have been proposed in which the tape is started whenever discontinuously and randomly occurring data are applied to record such data with the tape being maintained inoperative in the absence of the input. However, such known tape recorders require a considerable time to start and stop each recording interval so that with this type of tape recorder it is extremely difficult to feed one pitch per bite (8 pits) as in a paper tape perforator, or there is difficulty in that an excess quantity of the tape is fed for each pitch.

Consider now a cassette tape recorder, for example, designed to record typewritten character inputs, each consisting of 8 bits. The length of tape necessary to sequentially record 8 bits amounts to above 0.25 mm, if a recording density of 800 bits per inch (BPI) is assumed. With prior art cassette tape recorders of the type wherein the tape is started and stopped by the ON-OFF drive of pinch rollers, it takes about 10 to 20 ms for the tape to reach a prescribed running speed after it has been started. Assuming a running speed for the tape of about 10 cm/sec, the tape would be advanced by about 0.5 to 1.0 mm before the tape is accelerated to the prescribed speed at which recording is possible. In other words, to make a record on the tape over a length of 0.25 mm, a length of about 1.0 mm of the tape is consumed in order to bring it up to a speed whereby recording can be achieved. Also, as a time of about 10 ms is necessary to stop the tape, a length of about 0.5 to 1.0 mm of the tape will be wasted in stopping. For this reason, it has been the practice to store signals in a memory device and only when a predetermined quantity of the signals has been stored, the group of the signals is recorded as one block with only one start-stop operation being required. However, this method of recording requires a complicated and expensive control circuit.

SUMMARY OF THE INVENTION

It is an object of this invention to provide an improved incremental digital magnetic tape recorder capable of quickly starting and stopping the magnetic tape, and especially suitable for recording randomly occurring input signals.

Another object of this invention is to provide an improved incremental digital magnetic tape recorder in which the magnetic tape is advanced in the forward direction only upon an input signal being received so as to avoid waste of the tape caused by the continuous running thereof.

A further object of this invention is to provide an improved incremental digital magnetic tape recorder wherein the tape can be moved in the reverse direction for a predetermined length thereby enabling the correction or erasure of a signal which previously has been recorded.

According to this invention, these and further objects can be accomplished by providing an incremental digital magnetic tape recorder wherein a magnetic tape is advanced intermittently for recording intermittent input signals, characterized in that means for deflecting the magnetic tape away from the direction of its normal travel is provided between a magnetic head and tape take up means.

BRIEF DESCRIPTION OF THE DRAWINGS

Further objects features and advantages of the invention will become more apparent from the following detailed description considered in conjunction with the accompanying drawings in which.

DESCRIPTION OF THE PREFERRED EMBODIMENT

Figure 1:
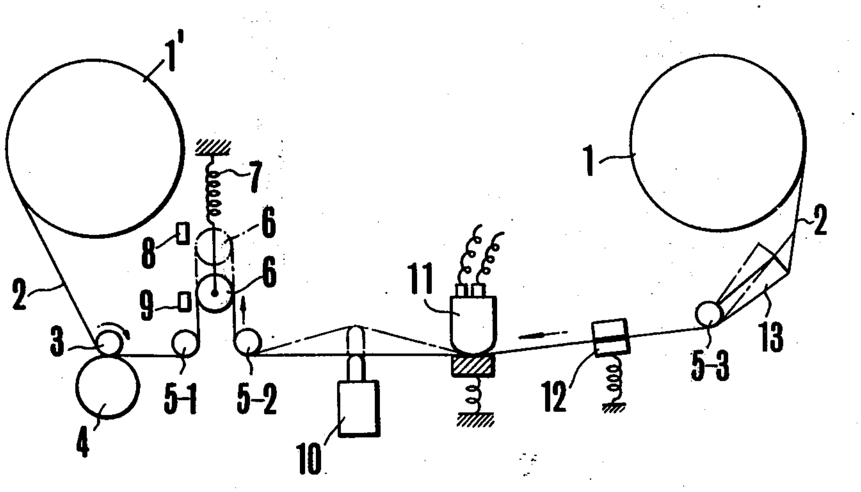
FIG. 1 shows a diagrammatic plan view useful to explain the principle of this invention.

Referring now to FIG. 1 of the accompanying drawing, a length of a magnetic tape 2 is reciprocated between pay-out and take-up reels 1 and 1, respectively, by means of a tape driving device, such as a capstan 3, through a pinch roller 4, guide rollers 5-1 and 5-2, and a movable tension roller 6 which is pulled by a suitable tension spring 7 for applying tension to the tape. Associated with the tension applying device are detect switches 8 and 9 for detecting whether the roller 6 is in a raised position or a lowered position. A tape deflector 10 is provided to deflect the tape away from the direction of its normal travel, that is in the lateral direction. A magnetic read/record head 11, a clamp 12 and a tension arm 13 for imparting a suitable slack or tension to the tape are also provided.

The principle of operation of the incremental digital tape recorder shown in FIG. 1 will now be described. Suppose that the tension roller 6 is in its lowered position shown by the solid line, that the pinch roller 4 urges the tape 2 against the capstan 3 and that the tape deflector 10 is in the solid line position illustrated. Under these conditions, since the tension roller 6 is pulled upwardly by the spring 7, a tension is applied to the tape to maintain the portion extending between guide roller 5-2 and magnetic head 11 in the solid line position. The tension imparted to the tape 2 by spring 7 is adjusted such that it will not overcome the frictional resistance imparted thereto by the pinch roller 4 and capstan 3 so as to move the tape 2. Under these conditions, when the tape deflector 10 is quickly advanced to the dotted line position by an external command, the tape will be deflected upwardly to increase the length thereof between the magnetic head 11 and a guide roller 5-2 from that shown by the solid line to that shown by the dash-dot line.

The reason for increasing the length of the tape is as follows.

Assume now that the moment of inertia of the capstan 3 is sufficiently large and that the pressure applied by the pinch roller 4 is also sufficiently large, then when the operating speed of the tape deflector 10 is high, the tape 2 at this portion will not be moved appreciably. If the mass of the tension roller 6 is larger than that of tension arm 13, the tension roller 6 will not be moved appreciably but tension arm 13 will be moved to the dotted line position from the solid line position thus causing the tape to slack. This slack of the tape caused by the tilting motion of the tension arm 13 permits the protrusion of the tape deflector to increase the length of the tape between guide roller 5-2 and magnetic head 11.

If the masses of the tension roller 6 and tension arm 13 are substantially equal then when the tape deflector 10 operates, the tension roller 6 will be pulled down and the tension arm 13 will be rotated in the counterclockwise direction. Thus, the increment in the length of the tape is supplemented by the displacements of these two members.

Generally, the displacement of the tape caused by the tape deflector 10 is supplemented by the tension roller 6 and tension arm 13 in accordance with the ratio between the masses of these two members.

If it is desired to cause the tape deflector 10 to move the tape 2 from right to left as viewed in FIG. 1, tension roller 6 is constructed to be heavier than tension arm 13.

Since tape 2 is clamped by the clamp 12, and since the frictional resistance exhibited by the clamp 12 is selected to be larger than the tension applied to the tension roller 6 by spring 7, if the speed of operation of the tape deflector 10 is low and if the mass of the tension roller 6 is small, then the force applied to the tape 2 by the deflector 10 would not move the tape through the clamp 2. Hence, the only result would be the vertical motion of the tension roller 6 when the tape deflector 10 is operated, and the tape 2 will not be moved past the magnetic head 11. It will be clear that the clamp 12 can be replaced by a pad (not shown) which functions to urge the tape 2 against magnetic head 11.

As above described, according to this invention, it is possible to move the tape by a definite length from right to left at the magnetic head 11 by a definite stroke of the tape deflector by the suitable selection of the moment of inertia of the capstan, the mass of the tension roller 6, the tension of the spring 7, the operating speed of the tape deflector 10, the pressure applied by clamp 12, and the mass and tension of the tension arm 13.

The direction of operation of the deflection device is not necessarily limited to the exact lateral direction but may be any direction inclined at an angle (for example 45°) with respect to the direction of normal running of the tape in which a component of force normal to the direction of running can be produced.

After the tape 2 has been moved from right to left through the magnetic head 11 by the operation of tape deflector 10, when tape deflector 10 is returned to the original position, the tape will become slack between magnetic head 11 and guide roller 5-2. However, as the tape is clamped by clamp 12 the slackened portion of the tape can not move back toward tension arm 13. Consequently, the slackened portion is absorbed by the upward movement of the tension roller 6.

In this manner, in response to successive input signals, the tape deflector 10 is operated to sequentially advance tape 2 by a definite length, and after a predetermined number of operations, the tension roller 6 will operate upper position detection switch 8. Although not shown in the drawing, when operated in this manner, the detection switch 8 energizes an electric motor which drives capstan 3 in the clockwise direction. However, as the tape 2 is sufficiently clamped by clamp 12, rotation of the capstan pulls down the tension roller 6. Roller 6 is moved downwardly until it operates lower position detection switch 9, at which time driving motor for the capstan 3 is deenergized thus stopping the same.

During succeeding operations of the predetermined number, the tape is advanced a predetermined length through the magnetic head 11 each time an input is received while the capstan 3 is maintained inoperative.

As the tape is advanced from right to left by the tape deflector 10, the tape is paid out from supply reel 1 to take-up reel 1'.

As described above, the invention provides a simple mechanism for intermittently feeding the tape, comprising a tape deflector 10 which deflects the tape away from the direction of its normal travel, and a tension roller 6 which absorbs the slack of the tape.

It is advantageous to install the tape deflector 10 at substantially the center between the magnetic head 11 and the guide roller 5-2. With this arrangement, it is possible to apply a large tension to the tape with a small force exerted by the tape deflector 10. Moreover, although the movement of the tape through the magnetic head 11 is small, such movement is easily controlled by adjusting a magnified displacement of the tape in the direction of operation of the tape deflector 10.

A quick response type tape deflector 10 is desirable such as moving coil type. Moving coil type electromagnetic actuators are characterized by their quick response and linear operating characteristics so that they are suitable for this invention.

Figure 2:
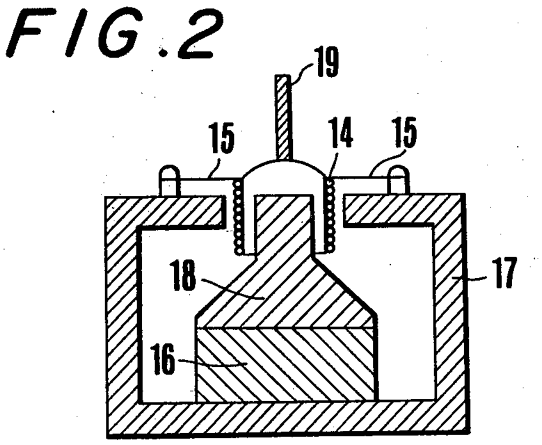
FIG. 2 shows a vertical sectional view of a moving coil type tape deflector.
Figure 3:
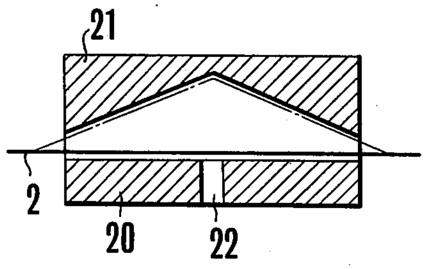
FIG. 3 shows a sectional view of a pneumatic type tape deflector.
Figure 4:
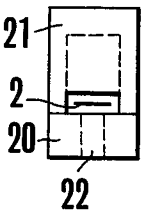
FIG. 4 is a plan view of the tape deflector shown in FIG. 3.

FIG. 2 shows a vertical sectional view of a moving coil type tape deflector comprising a moving coil 14 supported by a spring member 15, a permanent magnet 16, yokes 17 and 18 comprising a magnetic circuit for the magnetic flux generated by the permanent magnet, and a push rod 19 mounted on the moving coil 14 to engage the magnetic tape (see FIG. 1). With this construction, it is possible to control the stroke and the operating speed of the push rod 19 by controlling the magnitude of the current flowing through the moving coil. Accurate control of the tape deflector is made possible by providing a position detection device for push rod 19 and by feeding back the output of the position detection device to the control device for the current flowing through the moving coil. Further, a moving iron type or a pneumatically operated tape deflector can also be used, as shown in FIGS. 3 and 4. The tape deflector shown in these figures comprises a base plate 20 provided with an air inlet port 22 and a upper section 21 formed with a triangular cavity through which the tape 2 is caused to pass. When air is blown into the cavity through inlet port 22, tape 2 is pushed upwardly to a position shown by dotted lines. In this manner, the tape is advanced a definite length. The feed speed can be controlled by the adjustment of air pressure, and the air resistance of the inlet port 22.

In the above description, the tape 2 was advanced one step at each input. However, it is often desirable to move back the recorded tape one step for the purpose of correction or erasure.

Figure 5:
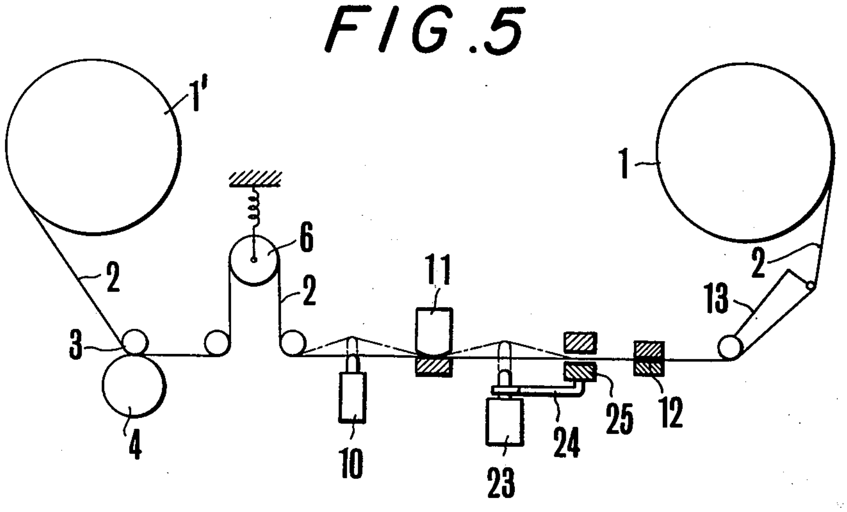
FIG. 5 is a diagrammatic representation of a modified embodiment of this invention including means for moving a recorded tape in the reverse direction.

A modified embodiment shown in FIG. 5 makes this possible. In the arrangement shown in FIG. 5, a second tape deflector 23 similar to the first deflector 10 is provided between the magnetic head 11 and clamp 12. The second tape deflector 23 is interlocked through a link 24 with a second clamp 25 which is located close to said clamp 12 so that at the time of advancing the tape 2, the second clamp 25 is first urged against the tape so as to apply a braking force thereto and then the tape is advanced in the reverse direction. More particularly, when the second tape deflector 23 is operated, the second clamp 25 fixes the tape 2. Thereafter, the tape is displaced laterally or deflected as shown by dotted lines in FIG. 5, by the second tape deflector 23. Then the length of the tape is increased between the magnetic head 11 and the second clamp 25. Since the tape is fixedly clamped by clamp 25, this increase in the tape length is not supplemented from the right hand reel 1 but from the side of the tension roller 6. In other words, the tape is moved back by a length equal to the increase thereof caused by the second tape deflector 23.

Generally, the operating speed of the second tape deflector 23 is selected to be lower than that of the first tape deflector 10 by taking into consideration the moment of inertia of the tension roller 6 and the tensile strength of the tape 2.

By applying an erasing signal to the magnetic head 11 concurrently with the operation of the second tape deflector 23, it is possible to erase the signal which has been recorded on the tape when it was moved in the forward direction.

Link 24 may be made of a leaf spring, and the second clamp 25 may be combined with the first clamp 12. Thus, the link 24 may be associated with clamp 12 such that only when the tape is advanced in the reverse direction the clamp 12 is released.

In the foregoing description a method and mechanism for intermittently and stepwisely feeding the tape in the forward or reverse direction have been described. In the embodiments, when the tension roller is held stationary, the tape recorder operates as a conventional tape recorder wherein the tape is moved continuously.

More particularly, when the tension roller 6 is held stationary, as the driving force of the capstan 3 is transmitted directly to the portion of the tape 2 passing through the magnetic head 11, the tape 2 will be advanced continuously. At this time, of course the tape deflector is not operated.

From the foregoing description, it will be clear that the invention provides a simple and efficient incremental digital magnetic tape recorder wherein randomly applied input signals are recorded on a magnetic tape which is advanced by a length just sufficient to record the signals, each time they are received.

Although the invention has been shown and described in terms of some preferred embodiments, it should be understood that many changes and modifications will be obvious to one skilled in the art without departing from the true spirit and scope of the invention as defined in the appended claims.

What is claimed is:

1. An incremental tape drive apparatus for intermittently advancing a tape past a recording head for the recording of intermittent signals, including in combination tape take-up and pay-out means, tape drive means for moving said tape in a take-up direction, recording head means past which said tape is to be intermittently advanced, tension roller means engaging the tape and having a relatively large mass for constantly applying to the tape a tension in the take-up direction, said tension roller means being interposed intermediate said tape drive means and said recording head means with the tension applied to the tape being insufficient to overcome the frictional resistance of said tape drive means whereby movement of the tape in the reverse direction is prevented, a single clamp means coacting with said recording head means for restraining said tape in recording position during intermittent recording operations, the tensioning force of said tension roller means being insufficient alone to overcome the frictional resistance of said clamp means, and tape deflecting means disposed intermediate said recording means and said tension roller means for deflecting said tape in a direction perpendicular to the normal travel thereof, whereby longitudinal stepping motion of the tape in the take-up direction is achieved.

2. An incremental tape drive apparatus according to claim 1 wherein said tape deflecting means is operated in response to an intermittent input signal to be recorded.

3. An incremental tape drive apparatus according to claim 1 which further conprises a tape tensioning device located between said clamp means and the pay-out means for providing a predetermined amount of slack in said tape therebetween under a predetermined tension less than the tension applied by said tension roller means.

4. An incremental tape drive apparatus according to claim 1 which further comprises a second tape deflecting means for deflecting said tape away from the direction of its normal travel, and second clamp means interlocked with said second tape deflection means for fixedly clamping said tape, said second tape deflection means and said second clamp means being located between said recording head means and the tape pay-out means whereby when said second tape deflection means is operated, said tape is moved in the opposite direction.

5. An incremental tape drive apparatus according to claim 1 wherein said tape deflecting means is operated by a moving coil type actuator.

6. An incremental tape drive apparatus according to claim 1 further including turn-on and turn-off control switch means controlling operation of said tape drive means, said turn-on and turn-off control switch means sensing the position of said tension roller means and responding to predetermined maximum and minimum positions of travel thereof for controlling operation of said tape drive means.

7. An incremental tape drive apparatus according to claim 6 wherein said tape deflecting means is operated in response to an intermittent input signal to be recorded.

8. An incremental tape drive apparatus according to claim 7 which further comprises a tape tensioning device located between said clamp means and the pay-out means for providing a predetermined amount of slack in said tape therebetween under a predetermined tension less than the tension applied by said tension roller means.

9. An incremental tape drive apparatus according to claim 8 wherein the apparatus is for a magnetic tape recorder.

10. An incremental tape drive apparatus according to claim 8 wherein said tape deflecting means is operated by a moving coil type actuator.

* * * * *